United States Patent
Carnegie et al.

(10) Patent No.: US 6,240,515 B1
(45) Date of Patent: May 29, 2001

(54) METHOD OF AUTHENTICATING A MAGNETIC CARD

(75) Inventors: Steven A. Carnegie, Blairgowrie; John Gardner, Pitlessie; Kenneth J. Peters, Dundee, all of (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/097,834

(22) Filed: Jun. 16, 1998

(30) Foreign Application Priority Data

Sep. 16, 1997 (GB) .................................................. 9719583

(51) Int. Cl.[7] .................................................. G06K 7/08
(52) U.S. Cl. .................................................. 713/182
(58) Field of Search .................................................. 713/185, 182; 705/64, 67; 235/380, 449, 454; 340/5.3, 5.31, 5.32, 5.33

(56) References Cited

U.S. PATENT DOCUMENTS

| | | | |
|---|---|---|---|
| 4,908,516 | * | 3/1990 | West ..................................... 250/556 |
| 5,267,315 | * | 11/1993 | Narita et al. ........................... 705/67 |
| 5,317,137 | * | 5/1994 | Wilkins ................................. 235/380 |
| 5,548,106 | * | 8/1996 | Liang et al. ........................... 235/454 |

FOREIGN PATENT DOCUMENTS 2269254    2/1994  (GB) .

\* cited by examiner

*Primary Examiner*—Tod Swann
*Assistant Examiner*—Matthew Smithers
(74) *Attorney, Agent, or Firm*—Francis L. Conte

(57) ABSTRACT

During a transaction using a magnetic card (16), test data is written to the card (16) at a constantly increasing frequency rate. The test data is then read from the card (16) and the high frequency cut-off point $f_0$ of the card (16) (i.e. the maximum write frequency above which it is no longer possible to read the test data from the card (16)), is determined. The high frequency cut-off point $f_0$ of a magnetic card (16) will gradually decrease over the lifetime of the card as the quality of the magnetic stripe (35) of the card (16) deteriorates. The high frequency cut-off point $f_0$ of the card (16) is compared with the high frequency cutoff point $f_0'$ of the card (16) in the previous transaction using the card (16). If the difference between the cut-off frequencies $f_0$ and $f_0'$ lies within a predetermined acceptable range, the card (16) is regarded as authentic and the transaction is allowed to proceed. If the difference in the cut-off frequencies $f_0$ and $f_0'$ lies outside this predetermined acceptable range, there is a substantial risk that the card (16) is a counterfeit card and hence the card is retained and the transaction terminated.

12 Claims, 6 Drawing Sheets

METHOD OF AUTHENTICATING A MAGNETIC CARD

BACKGROUND OF THE INVENTION

The invention relates to magnetic cards and, in particular, to a method and an apparatus for determining the authenticity of a magnetic card.

Magnetic cards can be used, in association with an appropriate read/writer, in a vast array of different environments. For example, magnetic user identification cards are commonly used in financial transactions, such as those conducted at automated teller machines (ATMs) to withdraw cash from a user's account, or at point of sales terminals in retail and other commercial establishments to purchase goods or services. Such magnetic cards incorporate a magnetic stripe which runs the length of the card adjacent one edge, the magnetic stripe having a series of tracks (normally three) in which data such as the user's account details, authorized transaction limit, expire date, and in some cases an encrypted personal identification number (PIN) is stored.

Due to their convenience, the use of such magnetic cards in financial transactions is becoming increasingly popular, with ATMs now replacing visits to traditional financial institutions for the cash requirements of many customers, and with point of sales terminals allowing cashless payment by credit or debit cards in the majority of shops, restaurants etc. As a consequence however, the level of fraud associated with the use of magnetic cards in financial transactions has also increased, especially at point of sales terminals where only a signature is required along with a card in order to carry out a transaction. When such cards are lost or stolen, the owner will normally become aware that the card is missing after a relatively short period of time and report this to the relevant authorities so that further use of the card can be prevented.

It has been known for criminals to produce counterfeit magnetic cards on which the user identification data which is stored on an authentic card has been copied. Such a counterfeit card may be used in financial transactions without the knowledge of the owner of the authentic card whose user identification data has been obtained by some means and copied to the counterfeit card. In some instances, even the personal identification number (PIN) associated with the authentic card has been obtained, allowing the counterfeit card to be used in transactions where a PIN is required, such as to obtain cash at an automated teller machine (ATM). As the techniques and equipment used by criminals become increasingly sophisticated, these counterfeit cards are often indistinguishable from the authentic card to the eye, and where the magnetic data has been copied accurately, a card reader may also be incapable of recognizing that the card is not authentic. The existence of a counterfeit card may go undetected for some time, until the owner of the authentic card realizes that money has been debited from his account for transactions that he did not carry out. In the meantime, the fraudster may continue to use the counterfeit card to obtain considerable funds or to make purchases. Moreover, it is often difficult to prove the existence of a counterfeit card.

SUMMARY OF THE INVENTION

It is an object of the present invention to increase the level of security associated with the use of magnetic cards and to detect the fraudulent use of counterfeit magnetic cards.

According to one aspect of the present invention there is provided a method of authenticating a magnetic user identification card, having data encoded in a magnetic stripe, characterized by the steps of:

writing test data to the card;

reading the test data from the card;

determining a parameter representative of the magnetic integrity of the magnetic stripe from the test data read from the card;

comparing the parameter representative of the magnetic integrity of the magnetic stripe with a reference parameter; and determining the authenticity of the card on the basis of the comparison.

According to a further aspect of the invention, there is provided an apparatus for authenticating a magnetic user identification card, having data encoded in a magnetic stripe, characterized in that it comprises read/write means for writing test data to the card and for reading the test data from the card;

processing means for determining a parameter representative of the magnetic integrity of the magnetic stripe of the card;

comparison means for comparing the parameter representative of the magnetic integrity of the magnetic stripe of the card with a reference parameter; and authentication means to determine the authenticity of the card on the basis of the comparison.

BRIEF DESCRIPTION OF THE DRAWINGS

An embodiment of the invention will now be described by way of example with reference to the accompanying drawings in which.

DETAILED DESCRIPTION

Figure 1:
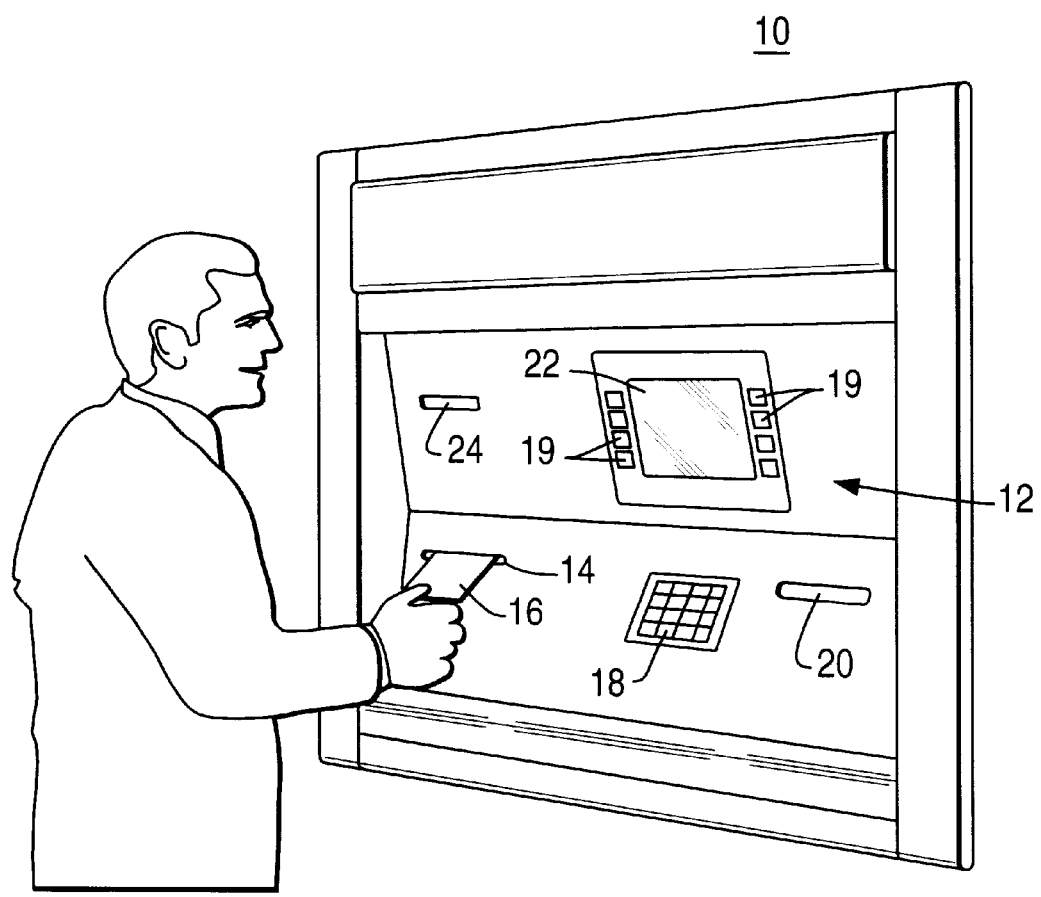
FIG. 1 is an external perspective view of an automated teller machine (ATM) embodying the present invention.

Referring to FIG. 1, the ATM 10 shown therein comprises a user interface in the form of a front panel 12. The front panel 12 includes a card reader slot 14 for insertion of a magnetic user identification card 16 at the commencement of a transaction, a key pad 18 and additional keytips 19 at the side of a display 22 for entering information during a transaction, a cash dispenser slot 20 for delivery of currency notes stored inside the ATM 10 to a customer, the display 22 for displaying information to the customer during a transaction and a receipt printer slot 24 for delivery of a receipt to the customer at the end of a transaction. The card reader, cash dispenser and receipt printer modules associated with the respective slots 14, 20 and 24 in the user panel 12 of the ATM 10 are designated by the same reference numerals in FIG. 2.

Figure 2:
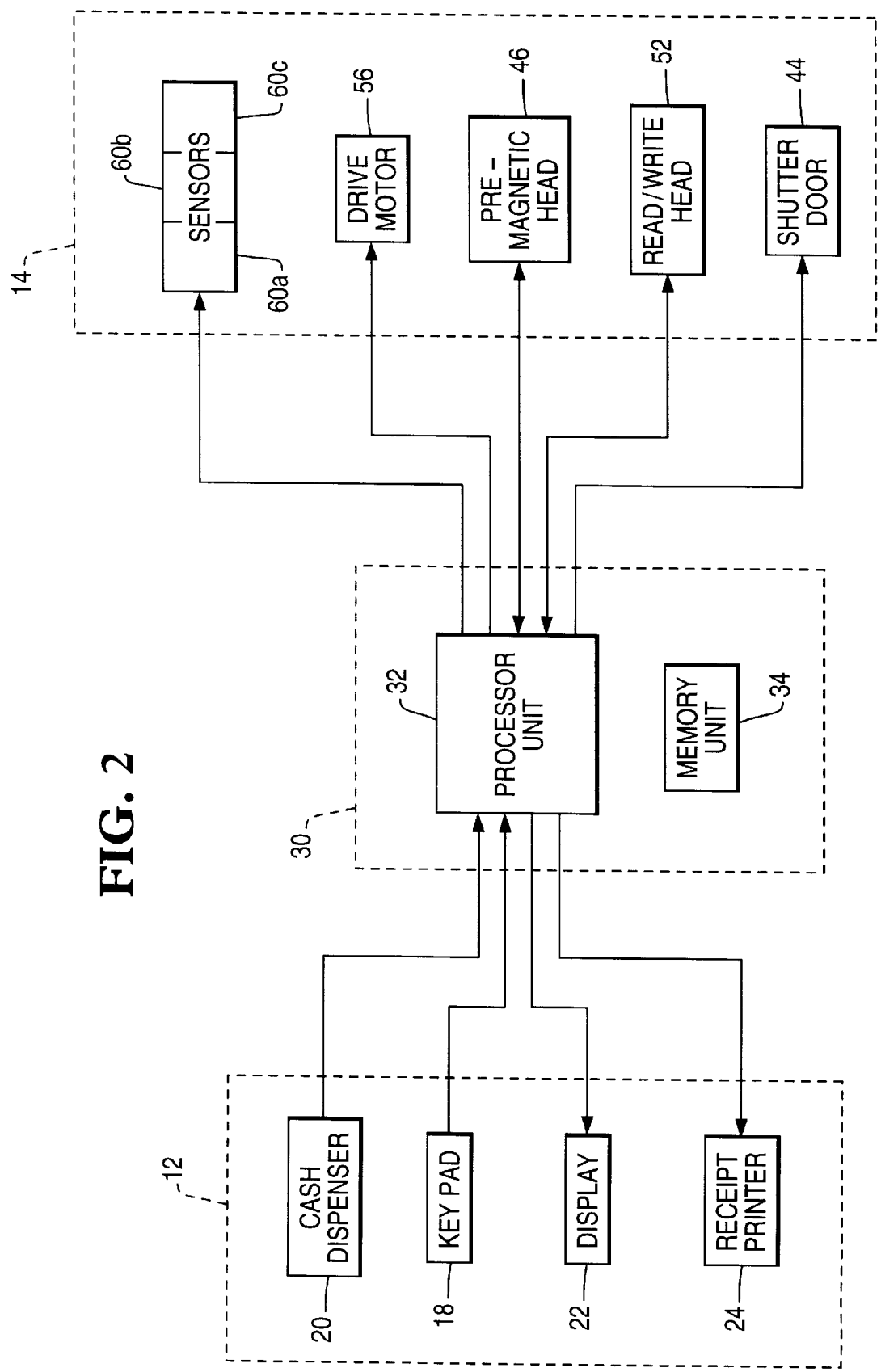
FIG. 2 is a block diagram representation of the ATM of FIG. 1.

With reference to FIG. 2, the ATM 10 further comprises a controller unit 30 which communicates with components of the front panel 12. The controller unit 30 includes a processor unit 32 and a memory unit 34 connected via a bus line (not shown) to the processor unit 32. The processor unit 32 receives signals from the key pad 18 and from various mechanisms of the card reader module 14, and provides output signals to the display 22, the receipt printer 24, the cash dispenser module 20 and to various mechanisms of the card reader module 14. It should be understood that the processor unit 32 controls the amount of cash dispensed by the cash dispenser 20, the information displayed on the display 22 and the information printed by the receipt printer 24. The processor unit 32 may include a microcomputer, and the memory unit 34 may be a non-volatile RAM. The structure and operation of such microcomputer and memory are well known and therefore will not be described.

Figure 3A:
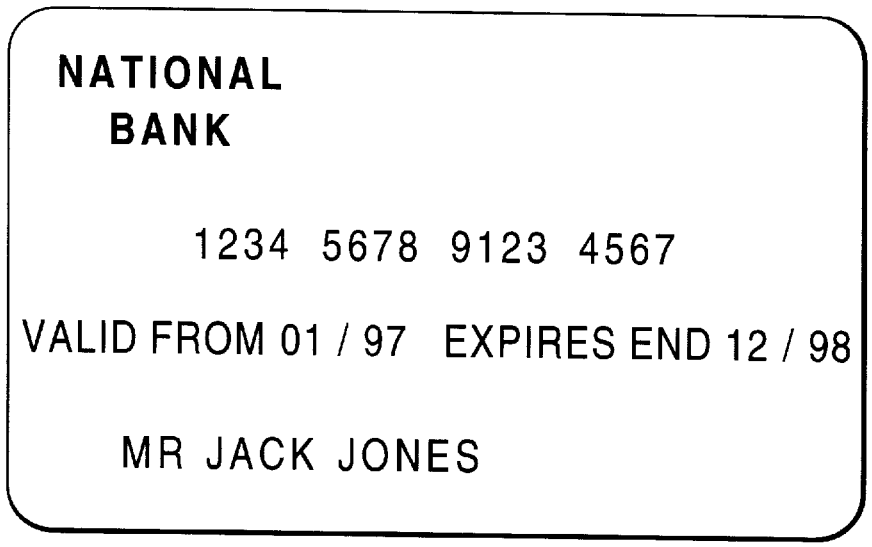
FIGS. 3A and 3B are plan views of the front and rear sides respectively of a magnetic card which may be used in the ATM of FIG. 1.
Figure 3B:
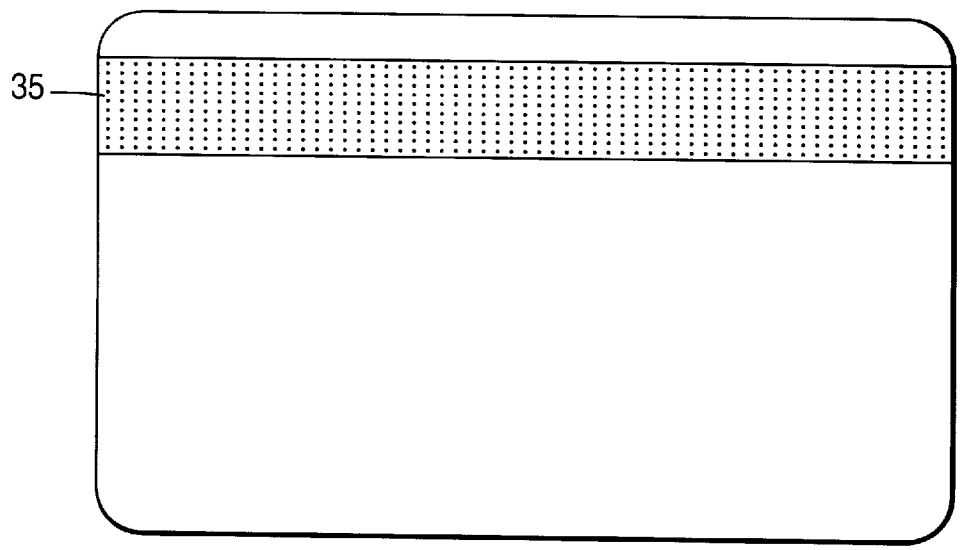

A magnetic user identification card 16 is shown in FIGS. 3A and 3B. The card 16 is of substantially rectangular shape, being approximately 85 mm long and 54 mm wide and has details such as the user's name, card number, the issuing financial institution and the expire date printed on its front surface as is shown in FIG. 3A. A magnetic stripe 35, approximately 12 mm wide, runs the length of rear side the card 16 as is shown in FIG. 3B and contains magnetic data stored in three parallel encoded tracks. Data is stored in the tracks by causing variations in the magnetization of the material which forms the magnetic stripe 35, normally a powdered metal oxide such as iron oxide or chromium oxide. Data is read from the stripe 35 by a read/write head in an appropriate card reader, by detecting the changes in magnetization along the length of the stripe and producing electrical signals which are representative of the data stored in the magnetic stripe 35. Tracks 1 and 2 of the magnetic stripe 35 contain encrypted user identification data which is written thereto when the card is initially issued, while Track 3 contains other details, such as the authorized transaction amount, etc. which may be read and written at any time. This data is written to the magnetic card at a frequency rate of approximately 82.7 bits per cm (210 bits per inch (bpi)). This frequency rate is an International Standard and is the minimum data write frequency which a standard card reader is required to be capable of reading.

In addition to the standard data described above, the card 16 also contains further encrypted data on Track 2 of the magnetic stripe 35. This encrypted data is annexed to the standard data on Track 2, and as will be described later, when a decryption and an authenticity algorithm are applied thereto, the magnetic integrity of the stripe 35 at the time the encrypted data was written to the card can be determined, together with details of the time of writing of the encrypted magnetic integrity data. This encrypted magnetic integrity data is preferably initially written to the card 16 when it is first issued but may also be initially written subsequently, during a transaction using the card 16. Over the lifetime of the card 16, the quality (magnetic integrity) of the magnetic stripe 35 tends to gradually deteriorate. This deterioration may be caused by a number of factors including general wear and tear, damage to the magnetic stripe 35 by scratching or bending the card 16, adverse temperature conditions, or by changes in magnetization of the material of the magnetic stripe 35 caused by placing the card 16 in close proximity to other magnetic materials such as other magnetic cards or the magnetic clasps frequently used on bags or purses. Frequent use of the card 16 may also contribute to deterioration of the magnetic integrity of the magnetic stripe 35.

Initially, this gradual deterioration of the magnetic integrity of the stripe 35 will have no obvious effect and the card 16 can be used as normal, since the read/write head of a card reader into which the card 16 is inserted will be capable of distinguishing the variations in the magnetization within the stripe 35 due to the written data (i.e. those occurring at the standard frequency rate of 82.7 bits per cm (210 bpi)) from other variations due to the deterioration of the magnetic stripe 35. However, over time, the deterioration of the magnetic stripe 35 is cumulative and eventually the read/write head will be incapable of distinguishing the variations in the magnetization within the stripe 35 due to the data written thereon from the variations in magnetization due to other factors and the data on the card 16 cannot be read. The card 16 must then be replaced. Although this may occur more quickly with some cards than with others depending on the extent of damage to the card 16, and although some more sensitive card readers may be capable of reading the card 16 when others are not, all cards have a finite lifetime and eventually must be replaced.

As will be described in detail later, when gradual deterioration in the magnetic integrity of the magnetic stripe 35 is detected in transactions using the card 16 over its lifetime, the encrypted magnetic integrity data on Track 2 of the magnetic stripe 35 will be overwritten by new encrypted data representative of the magnetic integrity of the stripe 35 at the time of the transaction.

Figure 4:
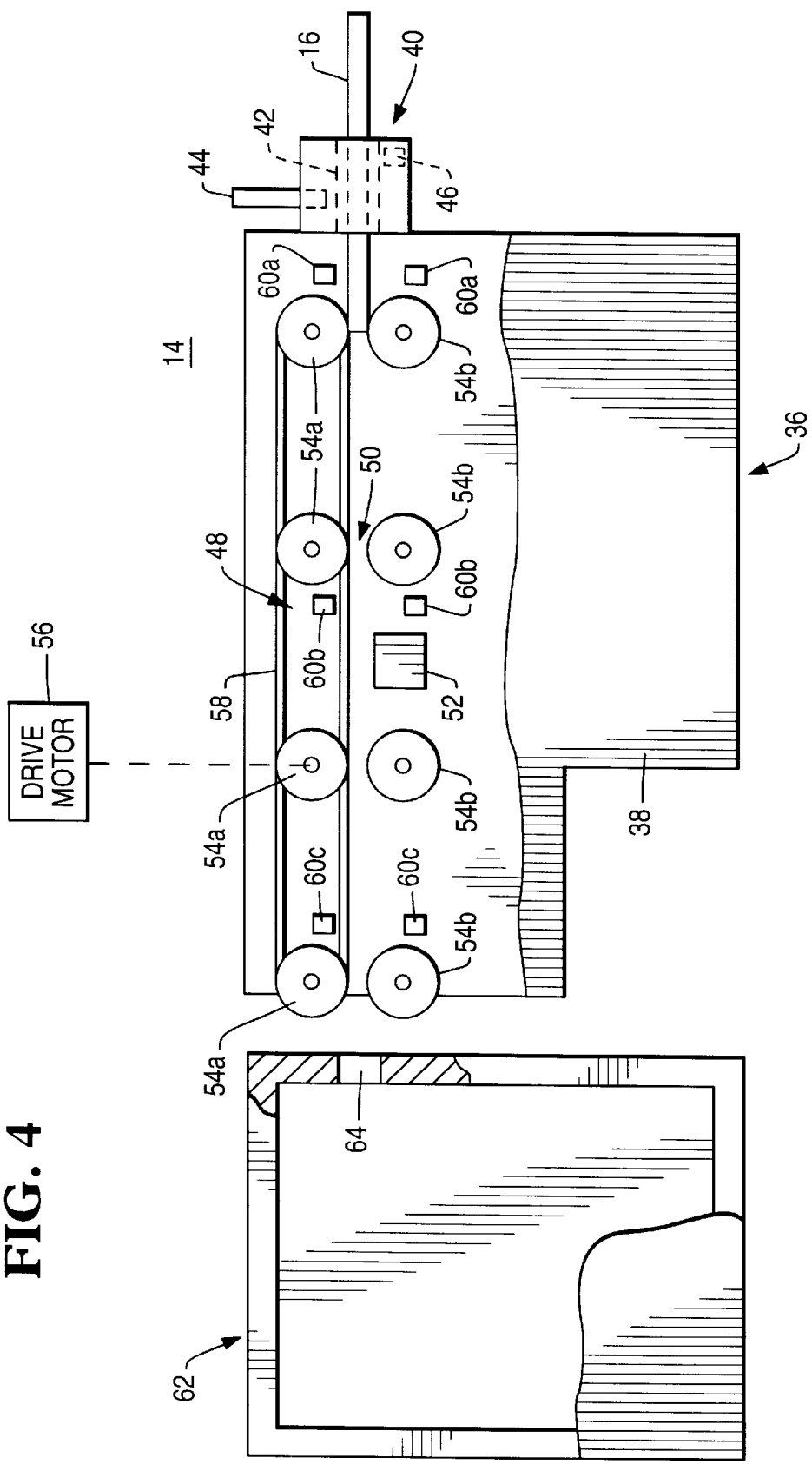
FIG. 4 is a diagrammatic representation of the main operating parts of the card reader module and the card capture bin of the ATM of FIG. 1, the shutter door of the card reader module being shown in an open position, so as to allow insertion of a magnetic card.
Figure 5:
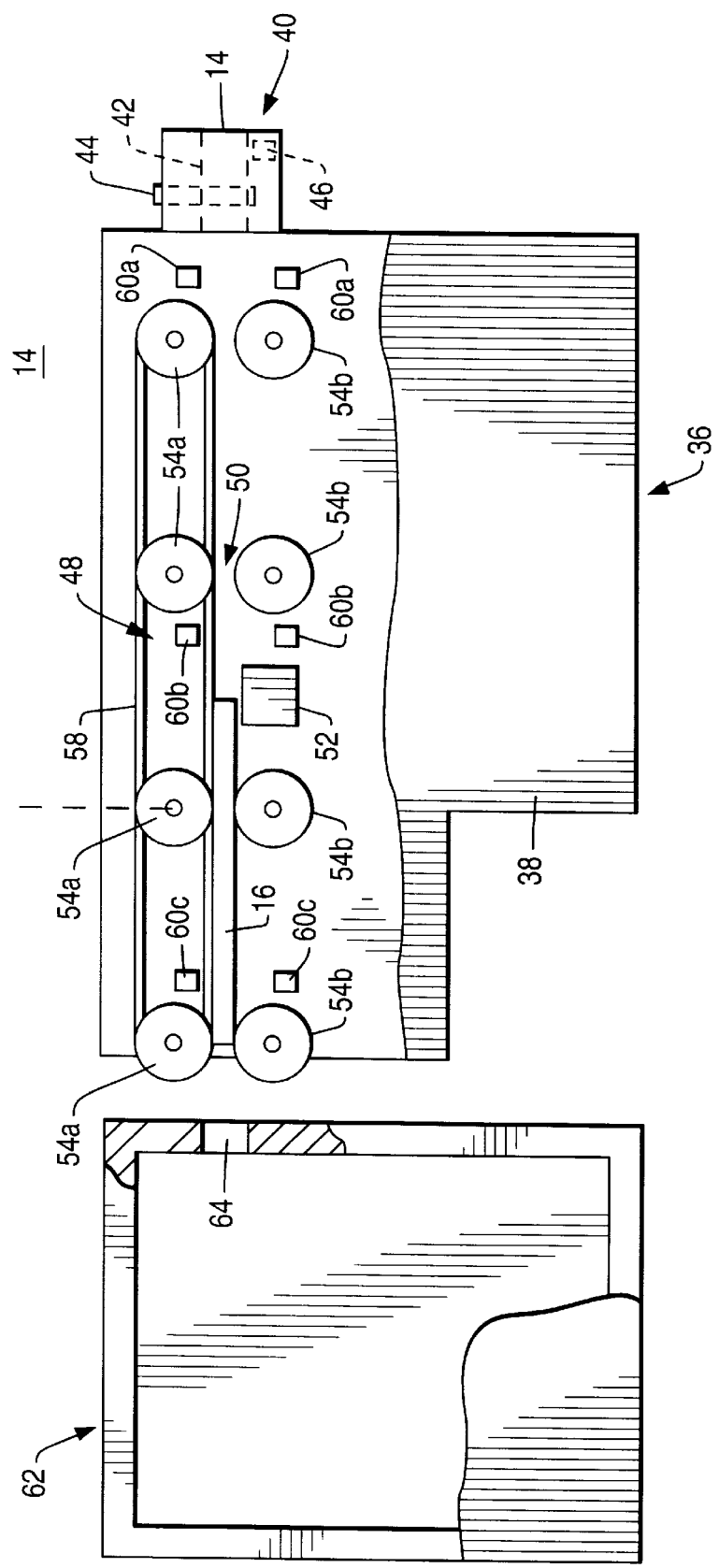
FIG. 5 is a view similar to FIG. 4 except that a magnetic card has been fully inserted into the card reader module and the shutter door is in a closed position.

Referring now to FIGS. 4 and 5, the card reader module 14 of the ATM 10 will now be described. The module 14 comprises an enclosure 36, including a side wall portion 38 which is illustrated broken away to show details of the internal components of the module 14. A shutter mechanism 40 is located in front of the card entry slot 14 at one end of the enclosure 36, and includes a shutter passage 42 which is aligned with the card entry slot 14 and a shutter door 44 which is movable between a closed position in which the shutter passage 42 is blocked, and an open position in which a user identification card 16 may move through the shutter passage 42. A pre-magnetic head 46 is provided in the shutter passage 42 adjacent the shutter door 44, and serves to detect the presence of a magnetic stripe on a card 16 which has been inserted into the card entry slot 14 before the shutter door 44 is opened.

A transport mechanism 48 is provided adjacent the shutter passage 42 and serves to move a user identification card 16 which has been inserted past the open shutter door 44 along a feed path 50. The transport mechanism 48 is of conventional design and typically includes an endless belt 58 and a plurality of pairs of rollers 54, each pair of rollers 54 comprising a roller 54a around which the endless belt 58 passes and an idler roller 54b. One of the rollers 54a is operatively coupled to a drive motor 56 and serves as a drive roller for the endless belt 58. A series of optical sensors 60a–c are located along the feed path 50, each sensor 60a–c including a light source located on one side of the feed path 50 and a light sensor aligned with the light source on the opposite side of the feed path 50. The optical sensors 60a–c are arranged to detect the leading edge of a user identification card 16 as the card 16 is moved past it along the feed path 50 in either direction. A magnetic read/write head 52 is provided along the feed path 50 and is positioned so that it is in alignment with the magnetic stripe 35 on a user identification card 16, as the card 16 is moved past the read/write head 52. A card capture bin 62 adjoins the card reader module 14 at the opposite end of the feed path 50 to the shutter door 44, and is provided with a generally rectangular slot 64 in a front wall portion thereof. The slot 64 is aligned with the feed path 50 and is dimensioned so that a user identification card 16 can pass therethrough from the feed path 50.

An ATM transaction, in the process of which the authenticity of a magnetic user identification card 16 is determined, will now be described with continuing reference to FIGS. 4 and 5 and with reference to the flow diagram of FIG. 6. An ATM customer inserts the leading edge of his user identification card 16 into the card reader slot 14 located on the front panel 12 of the ATM 10. On detection of the presence of a magnetic stripe 35 on the card 16 by the pre-magnetic head 46 in the shutter passage 42, a signal is transmitted to the processor unit 32 and the shutter door 44 is caused to open. If the pre-magnetic head 46 fails to detect the presence of a magnetic stripe 35 in its proximity, no detection signal is transmitted to the processor unit 32 and the shutter door 44 remains closed. Hence, further insertion of the card 16 into the card reader module 14 is not possible.

Assuming that a magnetic stripe 35 has been detected by the pre-magnetic head 46 and the shutter door 44 has opened, the customer can insert the card 16 further into the card reader module 14 until the leading edge of the card 16 engages the outer circumferential surface of the endless belt 58 of the transport mechanism 48 as is shown in FIG. 4. Immediately prior to engagement with the endless belt 58, the leading edge of the card 16 is detected by the first optical sensor 60a which transmits a detection signal to the processor unit 32. On receipt of this signal, the processor unit 32 causes the drive motor 56 of the transport mechanism 48 to be energized and the drive rollers 54a begin to rotate about their longitudinal central axes in a clockwise direction (with reference to FIG. 4). Rotation of the drive rollers 54a causes the endless belt 58 to move in a clockwise direction (with reference to FIG. 4) and, since the leading edge of the card 16 is in engagement therewith, the card 16 is carried forward in the direction of rotation of the belt 58 (from right to left with reference to FIG. 4). When the leading edge of the card 16 is detected by the optical sensor 60b, a detection signal is transmitted to the processor unit 32 and the shutter door 44 is caused to close. The shutter passage 42 is therefore blocked, so that foreign objects cannot be inserted into the card reader module 14 while the transaction is being processed.

As the card 16 continues to be moved along the feed path 50, the magnetic stripe 35 on its rear surface is in alignment with the read/write head 52, as the card 16 passes above it. The magnetic data stored in Tracks 1, 2 and 3 of the magnetic stripe 35, including the encrypted magnetic integrity data representative of the quality of the magnetic stripe 35, is read by the read/write head 52 and is transmitted to the processor unit 32. When the leading edge of the card 16 is detected by the optical sensor 60c, the card 16 has reached the end of the feed path 50. At this point, all the data stored in the tracks of the magnetic stripe 35 has been read by the read/write head 52 and transmitted to the processor unit 32.

Figure 6:
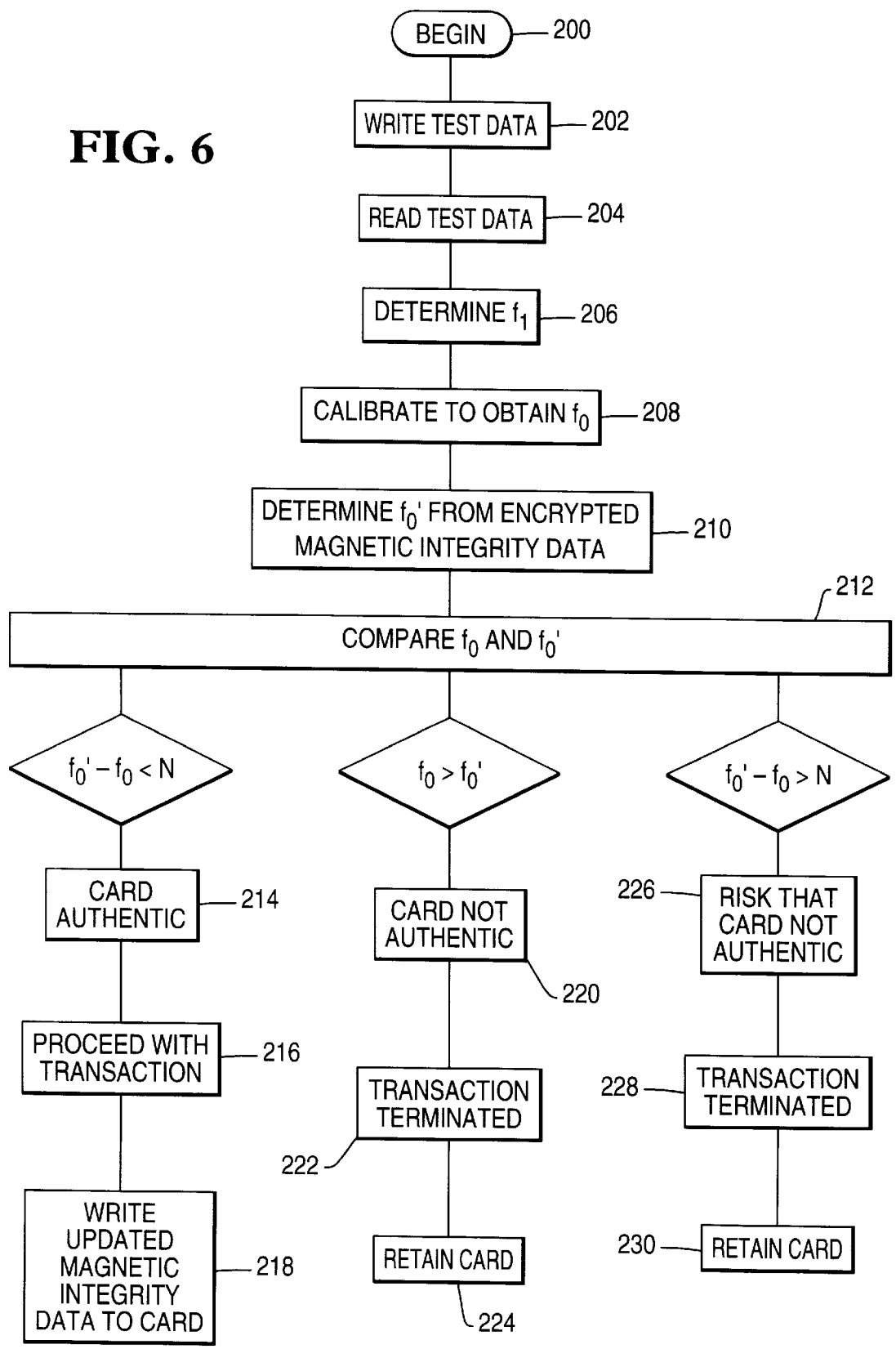
FIG. 6 is a flow diagram illustrating a card authentication process carried out by the ATM of FIG. 1.

On receipt of a detection signal from the optical sensor 60c by the processor unit 32, the card authentication process illustrated in the flow diagram of FIG. 6 begins (Step 200). The processor unit 32 causes the drive motor 56 of the transport mechanism 48 to be driven in reverse, causing the drive rollers 54a to rotate about their longitudinal central axes in an anticlockwise direction (with reference to FIGS. 4 and 5). As a consequence, the endless belt 58 begins to moves in an anticlockwise direction (with reference to FIGS. 4 and 5) and the card 16 in engagement therewith begins to move along the feed path 50 towards the shutter door 44 (from left to right with reference to FIGS. 4 and 5).

A detection signal is transmitted to the processor unit 32 when the leading edge of the card 16 is detected by the optical sensor 60b, and the drive motor 56 is again caused to be driven in a forward direction. This results in the card 16 again being moved along the feed path 50 towards the optical sensor 60c (from right to left with reference to FIGS. 4 and 5), in the manner described above. As the card 16 moves, the processor unit 32 causes the read/write head 52 to operate in a write mode and a test data sequence is written to Track 3 of the portion of the magnetic stripe 35 in alignment with the read/write head 52 as the card 16 passes above it (Step 202). This test data sequence is normally stored in the memory unit 34 of the control unit 30 of the ATM 10 and is retrieved therefrom at the commencement of a transaction.

The read/write head 52 is controlled by the processor unit 32 so that the test data sequence is written to Track 3 at a progressively increasing frequency rate. The test data is initially written to the card 16 at a frequency of approximately 59 bits per cm (150 bpi), the write frequency increasing constantly to a peak value of approximately 157.5 bits per cm (400 bpi). On completion of the test write sequence, the card 16 continues to be moved along the feed path 50 until the leading edge thereof is again detected by the optical sensor 60c.

On receipt of this detection signal from the optical sensor 60c, the processor unit 32 again causes the drive motor 56 to be driven in a reverse direction and the card 16 moves back along the feed path 50 towards the shutter door 44 (from left to right with reference to FIGS. 4 and 5) until the leading edge thereof is again detected by the optical sensor 60b. On receipt of this detection signal by the processor unit 32, the drive motor 56 is again driven in a forward direction causing the card 16 to move back along the feed path 50 towards the optical sensor 60c. This time, however, the processor unit 32 causes the read/write head 52 to operate in a read mode and the test data which has just been written to Track 3 of the magnetic stripe 35 is read and transmitted to the processor unit 32 (Step 204). It should be appreciated that since the card 16 has been transported back to the position where writing of the test data commenced (i.e. to a position where the leading edge of the card 16 is detected by the optical sensor 60b), the same portion of Track 3 of the magnetic stripe 35 will be in alignment with the read/write head 52 as the card 16 moves along the feed path 50, so that the test data written thereon can be read.

As described earlier, as the magnetic integrity of the magnetic stripe of a card deteriorates, it becomes increasingly more difficult for a read/write head to distinguish between variations in the magnetization within the stripe due to the data written thereon and variations due to other factors. When data is written to a card at very high frequencies, the resulting variations in the magnetization of the stripe will also occur at very high frequencies. These variations in the magnetization of the magnetic stripe are particularly difficult to distinguish from variations due to other factors, even when only relatively slight deterioration of the magnetic integrity of the stripe has occurred. In fact, for all magnetic cards, there will be a cut-off frequency $f_0$ above which the read/write head is no longer capable of tracking the variations in the magnetization due to the data written on the magnetic stripe (i.e. the maximum data write frequency at which data can be read from the card). As will be described later, the cut-off frequency $f_0$ of the card will also be dependent on the sensitivity of the read/write head of the card reader which may vary from one card reader to another. With a new card, a read/write head will generally be capable of tracking variations in magnetization up to a relatively high frequency, since few variations in magnetization due to other factors are detected. However, as the magnetic integrity of the magnetic stripe gradually deteriorates, the cut-off frequency $f_0$ will tend to gradually decrease, as it becomes increasingly more difficult to distinguish the variations in magnetization occurring at high frequencies from the variations in magnetization due to other factors.

The processor unit 32 monitors the test data read from the card 16 and determines an initial value for the cutoff frequency $f_1$ of the card 16 in this transaction (Step 206). As described earlier, the cut-off frequency $f_1$ detected in this transaction will be dependent on the sensitivity of the read/write head 52 of the card reader module 14 of the ATM 10 at which the transaction is being carried out. The sensitivity of the read/write head is primarily dependent on the card reader specification but may decrease as a result of dust accumulation or with age. Since the previous transaction during which the encrypted magnetic integrity data was written to the card 16 may have been carried out at a different ATM, the read/write head of which may have been more or less sensitive than that of the present ATM 10, it is necessary to adjust the initial cut-off frequency $f_1$ in order to compensate for variations in the sensitivity of read/write heads. A calibration algorithm is applied to the initial value of the cut-off frequency $f_1$ to obtain a compensated cut-off frequency $f_0$ which is substantially independent of the sensitivity of the read/write head 52 of the card reader module 14 of the ATM 10 at which the present transaction is being carried out (Step 208). The calibration algorithm computes a weighting factor $\alpha$ on the basis of the technical specification of the present read/write head 52 and from a comparison of the cut-off frequency $f_1$ with an average value calculated from the initial cut-off frequency values of magnetic cards which have been detected by the read/write head 52 during the previous one hundred card authentication processes carried out during transactions at the ATM 10. The compensated cut-off frequency $f_0$ is calculated by multiplying the initial cut-off frequency $f_1$ by the weighting factor $\alpha$.

A decryption algorithm is applied by the processor unit 32 to the encrypted magnetic integrity data which was read from Track 2 of the magnetic stripe 35 during reading of the standard data from the card. An authenticity algorithm is then applied to the decrypted magnetic integrity data by the processor unit 32 in order to determine the cutoff frequency $f_0'$ of the card 16 when the encrypted magnetic integrity data was written thereto and the time of writing the encrypted magnetic integrity data (Step 210). The encrypted magnetic integrity data will probably have been written to the card 16 in the previous transaction in which the card 16 was used or in the case of a new card, on issuance of the card 16, and as has been described above, is representative of the quality of the magnetic stripe 35 at that time. As will be described later, a calibration algorithm will also have been applied to the cut-off frequency $f_0'$ in the previous transaction to compensate for the sensitivity of the read/write head of the card reader of the ATM used in the previous transaction. The cut-off frequency $f_0$ detected in the present transaction is then compared with the cutoff frequency $f_0'$ in the previous transaction as determined from the encrypted magnetic integrity data on the card 16 (Step 212).

Unless the card 16 has been subjected to some adverse conditions or has suffered serious damage since the encrypted magnetic integrity data was written thereto (i.e. since the card 16 was last used or in the case of a new card, since the card 16 was issued), the difference between the cut-off frequency $f_0$ in the present transaction and the cutoff frequency $f_0'$ in the previous transaction should lie within a predetermined range of values. This predetermined range of values corresponds to an acceptable level of deterioration in the magnetic integrity of the magnetic stripe 35 of the card 16 over the period of time since the encrypted magnetic integrity data was written thereto (i.e. since the card was last used or since it was issued) and has previously been determined experimentally by monitoring the deterioration of the magnetic integrity of the magnetic stripe of a large number of magnetic cards over their lifetime. It should be understood that the acceptable level of deterioration will be dependent on the time period between the two transactions, the longer the period of time elapsed since the previous transaction, the greater the level of deterioration of the magnetic stripe 35 of the card 16 that can be expected to occur.

Under normal circumstances, the cut-off frequency $f_0$ of the card 16 would be expected to be approximately the same as the cut-off frequency $f_0'$ at the previous transaction if no noticeable deterioration of the magnetic stripe 35 has occurred, or to have decreased somewhat as a result of deterioration of the magnetic stripe 35. The cut-off frequency $f_0$ of the card 16 in a transaction should not, however, be greater than the cut-off frequency $f_0'$ in the previous transaction, since this would indicate an improvement in the magnetic integrity of the magnetic stripe 35 of the card 16, which is not possible. If such an increase in the cut-off frequency $f_0$ is detected, it is probable that the card 16 being used in a transaction is not the same card as that to which encrypted magnetic integrity data was written in the previous transaction, but rather is a new counterfeit card onto which the data on the authentic card, including the encrypted magnetic integrity data on Track 2 from which the quality of the magnetic stripe of the authentic card can be determined, has been copied. It should be understood that no information can be derived from the encrypted magnetic integrity data which consists of a series of digits similar to those of the standard data on Track 2 of the magnetic stripe 35, until decryption takes place and the authenticity algorithm is applied. Since the decryption and authenticity algorithms are stored in the memory unit 34 of the ATM 10, the fraudsters are unable to determine the cut-off frequency of the authentic card 16 at the time of producing the counterfeit card.

Referring again to the flow diagram of FIG. 6, if the difference between the cutoff frequency $f_0$ detected in the present transaction and the cutoff frequency $f_0'$ in the previous transaction lies within the predetermined acceptable range for the time period which has expired since the encrypted magnetic integrity data was written to the card 16, the card 16 is determined to be authentic by the processor unit 32 (Step 214). The financial transaction may proceed in the usual manner, as will be described later. In this case, the difference in the cut-off frequency of the card 16 in this transaction and that in the previous transaction can be attributed to a normal level of deterioration of the magnetic stripe 35 over the period of time between these transactions and hence the risk of the card 16 being a counterfeit card is considered low.

If, however, the cutoff frequency $f_0$ of the card 16 in the present transaction is determined to be greater than the cutoff frequency $f_0'$ of the card 16 in the previous transaction as has been determined from the encrypted magnetic integrity data on the card 16, the card 16 is determined to be counterfeit by the processor unit 32 (Step 220). Since such an increase in the cut-off frequency $f_0$ indicates that the quality of the magnetic stripe 35 of the card 16 has improved since the encrypted data was written thereto, which would not occur under normal circumstances, there is a very high probability that the card 16 is a counterfeit card onto which the data of the authentic card has been copied.

On determining that there is a high probability that the card 16 is counterfeit, the financial transaction is terminated (Step 222). The processor unit 32 causes the drive motor 56 of the transport mechanism 48 to be again driven in a forward direction, causing the drive rollers 54a to rotate in a clockwise direction (with reference to FIGS. 4 and 5). The endless belt 58 will also rotate in a clockwise direction (with reference to FIGS. 4 and 5) causing the card 16 in engagement therewith to be moved out of the feed path 50 (from right to left with reference to FIGS. 4 and 5) and to pass through the slot 64 in the card capture bin 62, where it is retained (Step 224). A message indicating that the card 16 has been retained and that no transaction is possible is displayed on the display 22 of the user panel 12 of the ATM 10.

Although it is most likely that fraudsters will copy the data of an authentic card to a new magnetic card resulting in the detection of a higher cut-off frequency than that of the authentic card in a previous transaction, copying of data to a magnetic card where some deterioration of the magnetic integrity of the magnetic stripe has taken place, may also occur. In such a case, the cut-off frequency of the counterfeit card in a transaction may be less than the cut-off frequency of the authentic card in a previous transaction as determined from the encrypted magnetic integrity data copied to the counterfeit card.

Therefore, if the cut-off frequency $f_0$ of the card 16 in the present transaction is determined to be less than the cutoff frequency $f_0'$ of the card 16 in the previous transaction as has been determined from the encrypted magnetic integrity data on the card 16, but the difference between these frequencies lies outside the predetermined range, the probability that the card 16 is not authentic is determined to be relatively high (Step 226). To minimize the risk of fraud, the financial transaction is terminated (Step 228). The card 16 is moved to the card capture bin 62 where it is retained and a message is displayed on the display 22 of the user interface 12 of the ATM 10 (Step 230).

It should be understood that the difference in the cut-off frequencies Δf falling outside the predetermined acceptable range does not conclusively determine that the card is not authentic. For example, if an authentic card has been subjected to adverse conditions or has suffered severe damage between two transactions, the level of deterioration of the magnetic stripe 35 may result in the difference in cut-off frequencies falling outside the predetermined range. In such a case, the authentic card will be retained in the card capture bin 62 and the customer is not able to complete the transaction. However, such extensive deterioration to a card over such a time period is exceptional, and the risk that the card is not authentic is deemed to outweigh the inconvenience to the customer in such a case. If the card is authentic, the customer can contact the issuing financial institution and a new card can be issued, or the old card may be returned with the encrypted magnetic integrity data thereon having been rewritten so as to reflect the quality of the magnetic stripe 35 at that time.

It is also conceivable that the magnetic stripe of a counterfeit card onto which the data of an authentic card has been copied may be of a similar quality to that of the authentic card. In such a case, the difference between the cut-off frequency $f_0$ of the counterfeit card 16 in the present transaction and the cutoff frequency $f_0'$ of the authentic card 16 in the previous transaction, as has been determined from the encrypted magnetic integrity data on the card 16, may fall within the predetermined acceptable range for the time period elapsed between the two transactions. However, the probability of this is relatively small and such a transaction is allowed to proceed.

Assuming that the card 16 has been determined to be authentic, the transaction now proceeds in the normal manner (Step 216). Instructions are displayed on the display 22 of the user panel 12 and the customer is requested to enter a personal identification number (PIN) on the key pad 18. This PIN is verified, usually at a central location remote from the ATM 10, and if determined to be correct, a menu of the various facilities available to the customer is then displayed on the display 22. If a cash withdrawal facility is selected, the customer is requested to enter the sum required on the key pad 18 or by means of additional keys 19 provided at the side of the display 22. The amount requested is verified against the authorized transaction amount and with the customer's balance which has been obtained from the central location and, if withdrawal of such an amount is authorized, the appropriate currency note or notes are picked from currency cassettes in the cash dispenser module 20 and are delivered to a stacking point within the ATM 10.

The authenticity algorithm and an encryption algorithm are now applied by the processor unit 32 to the cut-off frequency $f_0$ which has been detected in this transaction, so as to determine a new encrypted magnetic integrity data sequence from which the quality of the magnetic stripe 35 of the card 16 at this time and details of the time that the present transaction occurred for use in a future transaction using the card 16. The processor unit 32 causes the drive motor 56 to be driven in a reverse direction so that the endless belt 58 begins to move in an anticlockwise direction (with reference to FIGS. 4 and 5) causing the card 16 in engagement therewith to move toward the shutter door 44 (from left to right with reference to FIG. 4). A detection signal is transmitted to the processor unit 32 when the leading edge of the card 16 is detected by the optical sensor 60b, and the drive motor 56 is again caused to be driven in a forward direction. This results in the card 16 again being moved along the feed path 50 towards the optical sensor 60c (from right to left with reference to FIGS. 4 and 5), in the manner described above. As the card 16 moves, the processor unit 32 controls the read/write head 52 to operate in a write mode and to overwrite the encrypted magnetic integrity data in Track 2 with the updated encrypted magnetic integrity data, as the card passes (Step 218). It should be understood that since the calibration algorithm has been applied to cut-off frequency $f_0$, the new encrypted magnetic integrity data is also substantially independent of the sensitivity of the read/write head 52 of the card reader 14 of the ATM 10 at which this transaction is being carried out.

When the leading edge of the card 16 is detected by the sensor 60c, the drive motor 56 is again driven in the reverse direction causing the card 16 to move along the feed path toward the shutter door 44. When the leading edge of the card 16 is detected by the optical sensor 60b, the shutter door 44 is caused to open. As the card 16 progresses along the feed path 50, the leading edge thereof passes through the shutter passage 42 and emerges through the card entry slot 14 in the user panel 12 from where it is collected by the customer. The shutter door 44 is then closed. The currency notes are then delivered to the customer through the cash dispenser slot 20 in the user panel 12 of the ATM 10. If desired, a receipt for the transaction may be printed by the receipt printer module 24 and delivered to the customer through the receipt printer slot 24 in the user panel 12 of the ATM 10.

In the event that the customer fails to remove the user identification card 16 from the card entry slot 14 after carrying out the financial transaction, on the elapse of a predetermined length of time, the processor unit 32 causes the drive motor 56 to be driven in the forward direction, causing the card 16 to be moved back along the feed path 50. On receipt of a signal from the optical sensor 60c, the processor unit 32 causes the shutter door 44 to close and the card 16 to be deposited in the card capture bin 62 in a similar manner as described earlier. This prevents the card 16 being taken from the card entry slot 14 by a person who is not the card owner.

During the next and each subsequent transaction using the card 16, the updated encrypted magnetic integrity data is read from Track 2 and the cut-off frequency $f_0'$ of the card 16 in the previous transaction is determined therefrom by application of the decryption and authenticity algorithms. The test data sequence is written to Track 3 of the magnetic stripe 35 of the card 16, overwriting the test data written thereto in the previous transaction, and is then read therefrom in the same manner as described above, in order to determine an initial value of the cut-off frequency $f_1$, of the card 16 in the subsequent transaction. A calibration algorithm is then applied to the initial cut-off frequency $f_1$, to compensate for the sensitivity of the read/write head 52. The previous cut-off frequency $f_0'$ is compared with the compensated cut-off frequency $f_0$ and the authenticity of the card 16 is again determined on the basis of the comparison as described. If the card 16 is determined to be authentic, an updated encrypted magnetic integrity data is written to the card 16, for use in determining the authenticity of the card 16 in the next transaction.

The present invention is advantageous in that by monitoring the deterioration of the magnetic integrity or quality of the magnetic stripe of an individual magnetic card from one transaction to the next, a card having a substantially different magnetic integrity stripe which would not be expected under normal circumstances can readily be detected. This reduces the risk that a counterfeit card, onto which the magnetic data of an authentic card has been copied, can be used to obtain funds or to make purchases.

It should be understood that the encrypted magnetic integrity data and test data sequence may be written to other tracks of the magnetic stripe 35 of the card 16 provided sufficient storage capacity exists within that track for this data. Alternatively, after each transaction using a particular magnetic card 16, the cut-off frequency for the card 16 in that transaction is transmitted to the ATM host computer, usually at a location remote from the ATM 10. The cut-off frequency $f_0$ of the card is stored in memory and during the next transaction using the card 16, it is transmitted by the host computer to the ATM 10 at which the subsequent transaction is being carried out. This corresponds to the cut-off frequency $f_0'$ determined from the encrypted magnetic integrity data in the previous embodiment and authentication of the card 16 is carried out in the same manner as described earlier. This eliminates the requirement to apply the encryption and authenticity algorithms to the cut-off frequency and to write the encrypted magnetic quality data to the card 16 during a transaction.

Furthermore, instead of increasing the write speed of the read/write head 52 during writing of the test data to Track 3 of the magnetic stripe 35, the speed of movement of the card 16 along the feed path 50 may be decreased at a predetermined rate as it passes the read/write head 52, so as to increase the level of compression of the test data on the card at a predetermined rate. The write frequency of the read/write head 52 remains constant.

If a card 16 does not contain encrypted magnetic integrity data representative of the quality of the magnetic stripe 35 when it is initially issued to a customer by a financial institution, the cut-off frequency $f_0$ of the card can be determined during any transaction during the lifetime of the card at an appropriate ATM 10, by writing the test data thereto and reading it therefrom. The authenticity and encryption algorithms are applied to this cut-off frequency $f_0$ so as to determine an encrypted magnetic integrity data sequence from which the quality of the magnetic stripe 35 of the card 16 at this time and details of the time that the transaction occurred. The encrypted magnetic integrity data is then written to the card 16 so that it can be used to determine the authenticity of the card 16 in a future transaction.

In order to obtain a more accurate determination of the cut-off frequency $f_0$ of the card 16 in a particular transaction, the test data may be written to the card 16 and read therefrom more than once during the card authentication process. An average cut-off frequency $f_0$ based on the cut-off frequency values detected from each test read and write is then computed and is used to determine the authenticity of the card 16.

Alternatively, an initial determination of the cut-off frequency of the card 16 may be made from the test data written to the card 16 in the previous transaction which is read from the magnetic stripe 35 with the standard data. The test data from the previous transaction is then overwritten by identical test data and a second value of the cut-off frequency is determined. An average cut-off frequency is calculated and is used to determine the authenticity of the card 16 in the usual manner.

What is claimed is:

1. A method of authenticating a magnetic user identification card having data encoded in a magnetic stripe, the method comprising the steps of:

writing test data to the magnetic stripe of the card;

reading the test data from the card;

determining a parameter representative of the magnetic integrity of the magnetic stripe from the test data read from the card;

comparing the parameter representative of the magnetic integrity of the magnetic stripe with a reference parameter; and determining the authenticity of the card on the basis of the comparison.

2. A method according to claim 1, wherein the test data sequence is written to the card at a progressively increasing frequency.

3. A method according to claim 2, wherein the parameter representative of the magnetic integrity of the magnetic stripe is the cut-off frequency at which the test data can be read from the card.

4. A method according to claim 2, wherein the reference parameter is the cut-off frequency at which identical test data could be read from the card at a previous time.

5. A method according to claim 4, wherein the reference parameter is determined from data read from the magnetic stripe on the card.

6. A method according to claim 1, further comprising the step of calibrating the parameter representative of the magnetic integrity of the magnetic stripe so that it is independent of the sensitivity of the reading device used to read the test data from the card.

7. A method according to claim 1, further comprising the step of writing data representative of the magnetic integrity of the magnetic stripe to the card.

8. A method according to claim 1, further comprising the step of storing data representative of the magnetic integrity of the magnetic stripe at a remote location.

9. A method according to claim 1, wherein the card is determined to be authentic if the difference between the parameter representative of the magnetic integrity of the magnetic stripe of the card and the reference parameter lies within a predetermined range.

10. A method according to claim 9, wherein the magnitude of the predetermined range is dependent on the time period elapsed since the data from which the reference parameter is determined written to the card.

11. An apparatus for authenticating a magnetic user identification card having data encoded in a magnetic stripe, the apparatus comprising:

read/write means for writing test data to the magnetic stripe of the card and for reading the test data from the card;

processing means for determining a parameter representative of the magnetic integrity of the magnetic stripe of the card;

comparison means for comparing the parameter representative of the magnetic integrity of the magnetic stripe of the card with a reference parameter; and authentication means for determining the authenticity of the card on the basis of the comparison.

12. An automated teller machine (ATM) comprising:

a card reader having a slot for receiving a magnetic user identification card having data encoded in a magnetic stripe;

read/write means for writing test data to the magnetic stripe of the card and for reading the test data from the card;

processing means for determining a parameter representative of the magnetic integrity of the magnetic stripe of the card;

comparison means for comparing the parameter representative of the magnetic integrity of the magnetic stripe of the card with a reference parameter; and authentication means for determining the authenticity of the card on the basis of the comparison.

* * * * *